(12) United States Patent
Moberg

(10) Patent No.: US 8,020,921 B2
(45) Date of Patent: Sep. 20, 2011

(54) DOOR TRIM PANEL HAVING TEMPORARY SUPPORT AND PIVOT MEMBERS AND METHOD OF INSTALLING THE DOOR TRIM PANEL

(75) Inventor: Joshua Lewis Moberg, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 178 days.

(21) Appl. No.: 12/542,182

(22) Filed: Aug. 17, 2009

(65) Prior Publication Data

US 2011/0037289 A1    Feb. 17, 2011

(51) Int. Cl.
   *B60J 5/00* (2006.01)
(52) U.S. Cl. .................................................. 296/146.7
(58) Field of Classification Search ............... 296/146.7, 296/152, 187.05, 187.12, 39.1; 280/751, 280/728.3, 732; 49/502
   See application file for complete search history.

(56) References Cited

U.S. PATENT DOCUMENTS

| | | | | |
|---|---|---|---|---|
| 4,882,842 A | | 11/1989 | Basson et al. | |
| 4,949,508 A | * | 8/1990 | Elton | 49/502 |
| 5,111,619 A | * | 5/1992 | Billin et al. | 49/502 |
| 5,341,544 A | * | 8/1994 | Richter et al. | 24/289 |
| 5,345,721 A | * | 9/1994 | Stein et al. | 49/502 |
| 5,588,692 A | * | 12/1996 | Gandhi et al. | 296/146.7 |
| 5,931,682 A | * | 8/1999 | Takiguchi et al. | 439/34 |
| 5,993,226 A | * | 11/1999 | Yamaguchi | 439/157 |
| 6,029,409 A | * | 2/2000 | Wilson | 52/202 |
| 6,381,906 B1 | * | 5/2002 | Pacella et al. | 49/502 |
| 6,979,047 B2 | | 12/2005 | Lin et al. | |
| 6,988,759 B2 | | 1/2006 | Fin et al. | |
| 7,240,955 B2 | | 7/2007 | Twork | |
| 2005/0258665 A1 | | 11/2005 | Radu et al. | |
| 2007/0267889 A1 | * | 11/2007 | Flendrig et al. | 296/146.6 |
| 2007/0289222 A1 | | 12/2007 | Papi et al. | |
| 2008/0178533 A1 | * | 7/2008 | Nakamori et al. | 49/502 |
| 2010/0026028 A1 | * | 2/2010 | Smith et al. | 296/29 |

* cited by examiner

*Primary Examiner* — Kiran B. Patel
(74) *Attorney, Agent, or Firm* — Gifford, Krass, Sprinkle, Anderson & Citkowski, P.C.

(57) ABSTRACT

A door assembly for an automotive vehicle is provided. The door assembly includes a support structure having an upper section and a lower section. A pair of apertures are formed on the upper section of the support structure. A trim panel has an interior surface facing the passenger compartment of the automotive vehicle, an outer surface facing the support structure, top end and a lower end. A pair of pivot members are located adjacent the top end of the trim panel to engage the pair of apertures on the support structure. The pivot members allow the trim panel to be pivoted between a first position and a second position where the lower section of the support structure is spaced apart from the lower end of the trim panel.

9 Claims, 2 Drawing Sheets

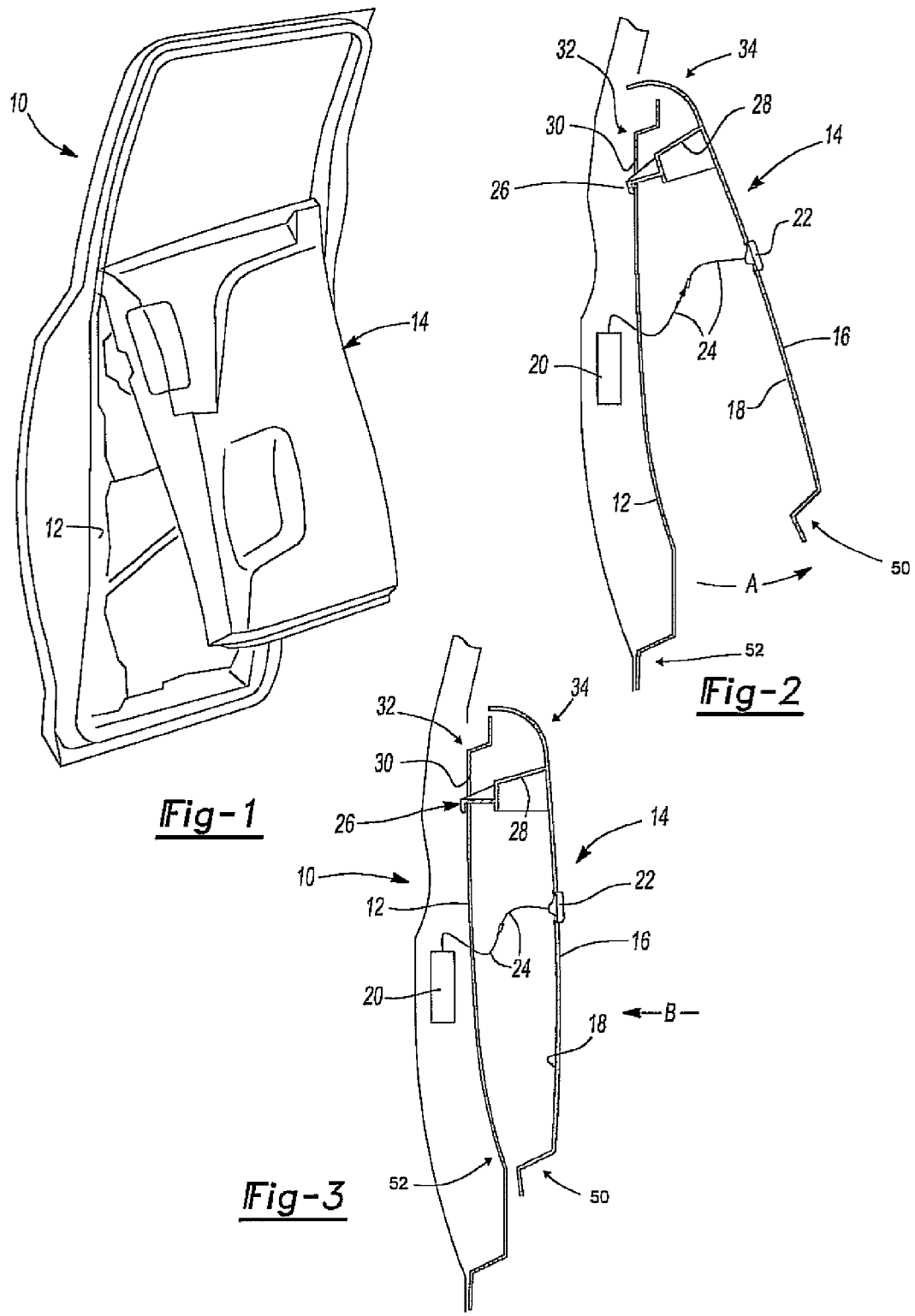

DOOR TRIM PANEL HAVING TEMPORARY SUPPORT AND PIVOT MEMBERS AND METHOD OF INSTALLING THE DOOR TRIM PANEL

FIELD OF THE INVENTION

The present invention relates generally to a door of an automotive vehicle and, in particular, to a door trim panel having a temporary support and pivot member.

BACKGROUND OF THE INVENTION

Most modern automotive vehicles utilize trim panels to provide an aesthetically pleasing appearance to the passenger compartment of the automotive vehicle. The trim panels are typically attached to a support structure of the automotive vehicle by a number of fasteners or clips strategically located on the trim panel. Openings for receiving the clips are formed on the support structure which is often the frame of the automotive vehicle or an additional panel or other structure attached to the frame.

In the case of automotive vehicle doors, the support structure often houses hardware components for various door mechanisms, illustratively including window mechanisms, door lock mechanisms, and side view mirror mechanisms. As such, the trim panels which attach to the support structure of the door are not only required to provide an aesthetically pleasing appearance, but also provide easy and convenient controls for the various door mechanisms for the occupant. Therefore, during assembly of the automotive vehicle, the controls on the trim panel must be connected to the hardware on the support structure via electronic wiring prior to the final installation of the door trim panel to the support structure.

It is known to provide door trim panels which have a horizontal load style attachment in which the clips of the door trim panel are aligned with the openings of the support structure and then the door trim panel is moved horizontally to engage the clips with the openings to install the door trim panel. Horizontal load style door trim panels offer several ergonomic benefits including low cost, a high quality appearance, and accurate fitting between the door trim panel and the support structure.

However, the horizontal load style door trim panels often decrease production efficiency as an assembly team member is required to hold the trim panel in one hand while connecting the electronic wiring between the hardware and the controls with the other hand. As the door trim panel is unwieldy, it is difficult for the assembly team member to perform such an operation quickly, and often requires the use of a second assembly team member to hold the trim panel while the other assembly team member connects the electronic wiring.

It is also known to provide door trim panels which have a hanging style attachment in which an upper edge of the door trim overlaps an upper edge of the support structure. The overlapping of the door trim and the support structure allows the door trim panel to pivot at the upper edge granting greater access to the assembly team member to connect the electronic wiring between the hardware and the controls. However, there are several disadvantages to hanging style door trim panels. First, as the upper edge of the trim panel is adjacent the window, the trim panel is required to be sealed against the ingress of water or other contaminants into the passenger compartment, thereby increasing the cost of the door trim panel. Further, hanging style door trim panels lack the ergonomic benefits, such as quality appearance and accurate fitting between the door trim panel and the support structure, offered by horizontal load style door trim panels.

Thus, there exists a need for an improved trim panel which provides the ease of assembly of a hanging style door trim panel, but without sacrificing the ergonomic benefits of a horizontal load style door trim panel.

SUMMARY OF THE INVENTION

The present invention provides a trim panel for an automotive vehicle door which overcomes the above-mentioned disadvantages of the previously known trim panel designs.

In brief, a door assembly for an automotive vehicle is provided. The door assembly includes a support structure attached to the door of the vehicle. The support structure includes an upper section having a pair of apertures and a lower section. A trim panel for attaching to the support structure includes an interior surface facing the passenger compartment, an outer surface facing the support structure, a top end, and a lower end. A pair of pivot members located on the outer surface of the trim panel extends towards the support structure. The pair of pivot members engages with the pair of apertures on the support structure to pivot the trim panel between a first position and a second position. In the first position, the trim panel is adjacent to the support structure, and in the second position the lower end of the trim panel is spaced apart from the lower section of the support structure.

As such, the assembly team member can insert the pivot members of the trim panel into the apertures of the support structure and the trim panel will be supported by the pivot members thereby allowing the assembly team member to pivot the trim panel from the first position to the second position so that the assembly team member can attach the hardware located on the support structure to the controls located on the trim panel quickly and easily.

BRIEF DESCRIPTION OF THE DRAWINGS

FIG. 1 is a perspective view illustrating a door of an automotive vehicle;

FIG. 2 is a partial cross-sectional view illustrating the engagement of the support structure and the trim panel when in the second position;

FIG. 3 is a partial cross-sectional view illustrating the engagement of the support structure and the trim panel when in the first position;

DETAILED DESCRIPTION OF THE INVENTION

Figure 4:
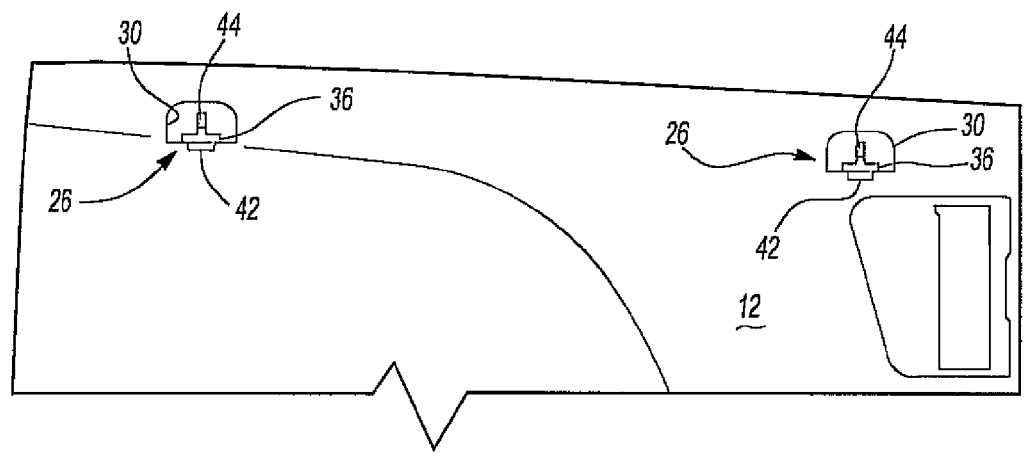
FIG. 4 is a partial rear view illustrating the engagement of the trim panel to the support structure.

The present invention has utility as a trim panel assembly for an automotive vehicle which overcomes the above-mentioned disadvantages. The inventive trim panel assembly provides an assembly team member with the accessibility of a hanging style door trim without sacrificing the economical, appearance, and fitting benefits afforded by a horizontal load style trim panel.

Referring to FIG. 1, a door for an automotive vehicle is generally illustrated at 10. The door 10 includes a support structure 12 and a trim panel 14 for attaching to the support structure 12 to provide an aesthetically pleasing appearance to the passenger compartment of an automotive vehicle. The trim panel 14 includes an interior surface 16 facing the passenger compartment, and an outer surface 18 facing the support structure 12. The support structure 12 is the structural frame of the door 10 or, in the alternative, an additional panel or other structure attached to the structural frame of the door 10.

The trim panel 14 is attached to the support structure 12 through a number of fasteners or clips, not shown, located strategically on the trim panel 14, which snap fit or frictionally engage corresponding openings located on the support structure 12. The clips include an upper section for attaching to the openings of the support structure 12, and a lower section for attaching to the outer surface 18 of the trim panel 14 or a housing extending from the outer surface 18.

With reference to FIG. 2, a hardware component 20 for various door related mechanism, illustratively including window mechanisms, door lock mechanisms, and side view mirror mechanisms, is disposed on the support structure 12. The hardware 20 is optionally, the actual hardware of the door mechanism such as a motor which manipulates the position of the window, a servo which locks or unlocks the door 10, or an electrical and/or physical connection to a motor or servo located in another location. For example, the hardware 20 related to the side view mirror mechanism is the electronic wiring which extends from the motor located within the side view mirror housing to the door 10.

In order for an occupant of the automotive vehicle to control the various door mechanisms, the trim panel 14 includes controls 22 located on the interior surface 16 of the trim panel 14. It is appreciated, that the controls 22 encompass buttons, switches, knobs, and any other device known to those of ordinary skill in the art to control the various door mechanisms.

The hardware 20 and the controls 22 are connected through electronic wiring 24 extending from both the hardware 20 and the controls 22. In the alternative, one of the hardware 20 and the controls 22 has wiring 24 extending therefrom for attaching to the other of the hardware 20 or the controls 22. Further, the hardware 20, as in the example of the side view mirrors mechanisms, optionally constitutes the electronic wiring 24 for connecting to the controls 22.

As discussed above, the ability of an assembly team member to quickly and easily connected the hardware 20, located on the support structure 12, to the controls 22, located on the trim panel 14, via electronic wiring 24 is a major concern affecting production efficiency. As such, the trim panel 14 is provided with a feature which temporally supports the trim panel 14 an the support structure and allows the trim panel 14 to pivot relative to the support structure 12 so as to provide greater access for the assembly team member to connect the hardware 20 to the controls 22.

The above described feature is in the form of a pair of pivot members 26 disposed on a housing 28, referred to as a "doghouse," which extends from the outer surface 18 of the trim panel 14 towards the support structure 12. The housings 28 are of the same type used to attach the lower section of the clip to the outer surface 18 of the trim panel 14. It is appreciated, that the pivot members, optionally, extend directly from the outer surface 18 of the trim panel 14.

As seen in FIGS. 2-4, the support structure 12 includes a pair of apertures 30 which correspond in location to the pair of pivot members 26. The apertures 30 are disposed on an upper section 32 of the support structure 12, and the pair of pivot members 26 are disposed adjacent a top end 34 of the trim panel 14. The apertures 30 are dimensioned to receive the pivot members 26 so as to support and pivot the trim panel 12 relative to the support structure 12.

Figure 5:
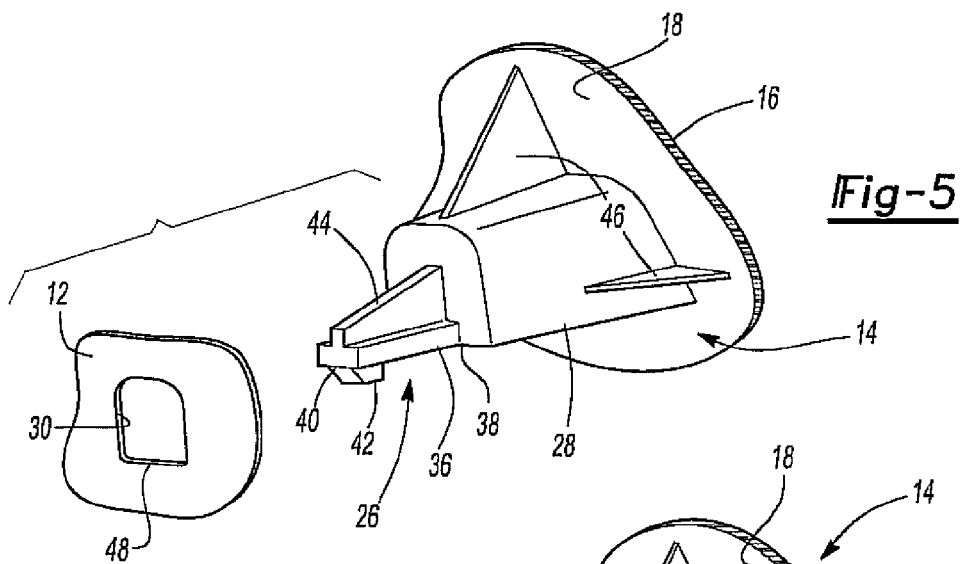
FIG. 5 is an enlarged partial view illustrating the support structure and the trim panel prior to engagement.
Figure 6:
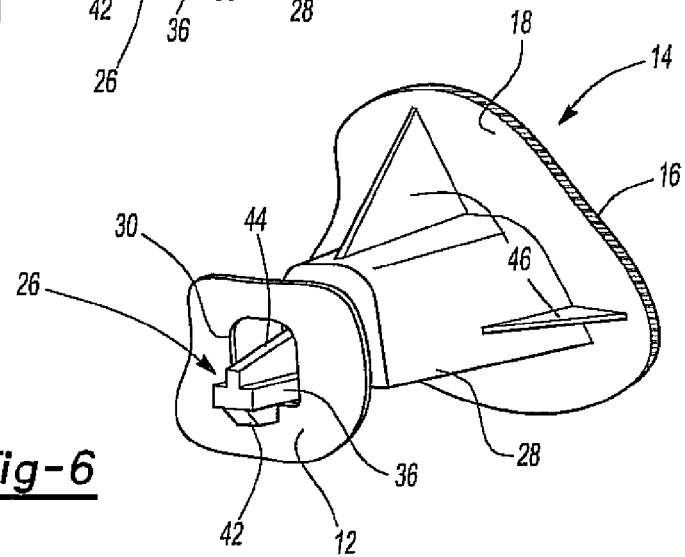
FIG. 6 is an enlarged partial view illustrating the support structure and the trim panel after the engagement of the pivot member with the aperture.

With reference to FIGS. 5 and 6, the engagement of pivot members 26 with the pair of apertures 30 will now be discussed. The pivot members 28 are formed as an elongated protrusion 36 which extends from a proximate end 38 adjacent the housing 28 to a distal end 40.

A retention tab 42 extends from the distal end 40 of the protrusion 36 in a direction generally traverse to the elongated protrusion 36. The retention tab 42 hooks onto the aperture 30 preventing the trim panel 14 from sliding off the support structure 12 prior to the installation of the clips to the openings on the support structure 12, as best seen in FIG. 4.

A strengthening rib 44 extends from the proximate end 38 to the distal end 40 to strengthen the elongated protrusion 36 against deflection. In addition, housing 28 includes support ribs 46 which extend between the housing 30 and the outer surface 18 of the trim panel 14 to provide rigid support for the housing 28. The combination of the strengthening rib 44 and the support ribs 46 allows the trim panel 14 to be supported solely by the pivot members 26 without damaging the trim panel 14.

The elongated protrusion 36 has a generally planar shape which corresponds to the shape of the aperture 30, specifically, the flat bottom side 48 of aperture 30. The corresponding shapes of the elongated protrusion 36 and the bottom side 48 of aperture 30 provide increased stability when the pivot members 26 are supporting the trim panel 14, due to the contact area between the elongated protrusion 36 and the bottom side 48 of the aperture 30.

During the assembly of the automotive vehicle, an assembly team member will retrieve a trim panel 14 which are usually stored in bulk on a shelf or other storage unit adjacent to the point in the assembly line where the trim panels 14 are installed to the automotive vehicle. The clips are often previously attached to the trim panel 14 so that all an assembly team member is required to do is connect the hardware 20 to the controls 22 via the electronic wiring 24, and install the trim panel 14 to the support structure 12 via the clips.

To connect the hardware 20 to the controls 22, the assembly team member aligns and inserts the pivot members 26 into the apertures 30. Once inserted, the trim panel 14 is temporally supported on the support structure 12 due solely to the contact between the elongated protrusion 36 and the bottom side 48 of the aperture 30, and the pivot members 26 are retained within the apertures 30 due to the retention tabs 42. As such, the assembly team member is no longer required to hold the trim panel 14 in place, and the trim panel 14 acts as a hanging style trim panel.

The assembly team member then pivots the trim panel 14, about the pivot members 26 and the apertures 30) by grasping a lower end 50 of the trim panel 14 and lifting upwards in the direction of arrow A in FIG. 2. The trim panel 14 is pivotal between a first position, as seen in FIG. 3, and a second position, as seen in FIG. 2. In the first position, the trim panel 14 is adjacent the support structure 12, specifically, the top end 34 of the trim panel 14 is adjacent the upper section 32 of the support structure 12 and the lower end 50 of the trim panel is adjacent a lower section 52 of the support structure 12.

In the second position, the lower end 50 of the trim panel 14 is spaced apart from the lower section 52 of the support structure. Further, as the top end 34 of the trim panel 14 has a curved or arcuate shape the top end 34 of the trim panel 14 overlaps a portion of the upper section 32 of the support structure, as seen in FIG. 2, without the top end 34 being attached, hooked, or supported by the upper section 32 of the support structure 12 as in hanging style trim panels. Pivoting the trim panel 14 from the first position to the second position provides the assembly team member greater access to the outer surface 18 of the trim panel 14 and the support structure 12 so as to quickly and easily connect the hardware 20 and the controls 22 via the electronic wiring 24.

Placing the pivot members 26 and the apertures 30 adjacent the top end 34 of the trim panel 14 and on the upper section 32 of the support structure 12, respectively, provides a distinct advantage as most assembly lines are elevated. As the door is in a raised position the assembly team member is in a preferred position to connect the hardware 20 to the controls 22 by reaching between the spaced apart lower end 50 of the trim panel 14 and the lower section 52 of the support structure.

Once the hardware 20 and the controls 22 have been connected, the assembly team member pivots the trim panel 14 from the second position to the first position. To install the trim panel 14 to the support structure 12, the assembly team member treats the trim panel 14 as a horizontal load style trim panel and aligns the clips located on the trim panel 14 with the openings located on the support structure 12. The assembly team member then engages the clips with the openings by moving the trim panel 14 in the horizontal direction of arrow B in FIG. 3.

It is appreciated, of course, that although the illustrated embodiment relates to a trim panel for a door of an automotive vehicle, the invention is applicable for other vehicles, and various locations, illustratively including rear hatch and side wall.

From the foregoing it can be seen that the present invention provides an improved trim panel having temporary support and pivot members which allow an assembly team member to quickly and easily attach the controls located on the trim panel to the door mechanisms and install the trim panel to the support structure. Having described the invention, however, many modifications thereto will become apparent to those of skill in the art to which it pertains without deviation from the spirit of the invention as defined by the scope of the appended claims.

It is claimed:

1. A door assembly for an automotive vehicle, said door assembly comprising:
   a support structure having an upper section and a lower section, said upper section having a pair of apertures;
   a trim panel having a top end and a lower end, said trim panel includes an interior surface facing a passenger compartment of the automotive vehicle, and an outer surface facing said support structure; and
   a pair of pivot members disposed on said outer surface of said trim panel, said pivot members engage said pair of apertures to pivot said trim panel between a first position wherein said trim panel is adjacent said support structure, and a second position, wherein said lower end of said trim panel is spaced apart from said lower section of said support structure.

2. The door assembly of claim 1, wherein said top end has an arcuate shape and said top end overlaps a portion of said upper section of said support structure when in said second position.

3. The door assembly of claim 1, wherein said pair of pivot members are a pair of elongated protrusions.

4. The door assembly of claim 3, wherein each of said pair of elongated protrusions having a retention tab at one end, said retention tab extending in a direction generally traverse to the longitudinal direction of said elongated protrusions.

5. The door assembly of claim 1, wherein each of said pair of pivot members are disposed on a housing extending from said outer surface of said trim panel.

6. The door assembly of claim 5, wherein said housings have a support rib extending between said housing and said outer surface of said trim panel.

7. The door assembly of claim 5, wherein said elongated protrusions have a strengthening rib extending between said elongated protrusion and said housing.

8. The door assembly of claim 1, wherein a hardware component for a door mechanism is disposed on said support structure, and a control for said hardware component is disposed on said trim panel.

9. The door assembly of claim 8, wherein said hardware component is connected to said control when said trim panel is in said second position.

* * * * *

UNITED STATES PATENT AND TRADEMARK OFFICE
CERTIFICATE OF CORRECTION

PATENT NO. : 8,020,921 B2  
APPLICATION NO. : 12/542182  
DATED : September 20, 2011  
INVENTOR(S) : Joshua Lewis Moberg Page 1 of 1

It is certified that error appears in the above-identified patent and that said Letters Patent is hereby corrected as shown below:

Column 4, line 5, replace "30)" with --30--

Signed and Sealed this  
Twentieth Day of December, 2011

David J. Kappos  
*Director of the United States Patent and Trademark Office*